(12) United States Patent
Pappalardo et al.

(10) Patent No.: US 8,060,725 B2
(45) Date of Patent: Nov. 15, 2011

(54) PROCESSOR ARCHITECTURE WITH PROCESSING CLUSTERS PROVIDING VECTOR AND SCALAR DATA PROCESSING CAPABILITY

(75) Inventors: Francesco Pappalardo, Paternò (IT); Giuseppe Notarangelo, Gravina di Catania (IT); Elena Salurso, Mascalucia (IT); Elio Guidetti, Como (IT)

(73) Assignees: STMicroelectronics S.R.L., Agrate Brianza (MI) (IT); STMicroelectronics N.V., Amsterdam (NL)

( * ) Notice: Subject to any disclaimer, the term of this patent is extended or adjusted under 35 U.S.C. 154(b) by 528 days.

(21) Appl. No.: 11/768,481

(22) Filed: Jun. 26, 2007

(65) Prior Publication Data

US 2008/0016319 A1    Jan. 17, 2008

(30) Foreign Application Priority Data

Jun. 28, 2006 (EP) .................................... 06116243

(51) Int. Cl.
*G06F 15/00* (2006.01)
(52) U.S. Cl. ........................................... 712/10; 712/22
(58) Field of Classification Search .................. 712/10, 712/20–22
See application file for complete search history.

(56) References Cited

U.S. PATENT DOCUMENTS

| | | | | |
|---|---|---|---|---|
| 5,513,366 A | * | 4/1996 | Agarwal et al. | 712/22 |
| 5,842,031 A | * | 11/1998 | Barker et al. | 712/23 |
| 6,839,828 B2 | * | 1/2005 | Gschwind et al. | 712/20 |
| 6,915,411 B2 | * | 7/2005 | Moreno et al. | 712/22 |
| 7,219,212 B1 | * | 5/2007 | Sanghavi et al. | 712/6 |
| 2002/0004916 A1 | | 1/2002 | Marchand et al. | 713/322 |
| 2002/0099924 A1 | | 7/2002 | Mishioka et al. | 712/24 |
| 2005/0283587 A1 | * | 12/2005 | Pappalardo et al. | 712/22 |
| 2006/0010255 A1 | * | 1/2006 | Van Berkel et al. | 710/1 |
| 2006/0103659 A1 | * | 5/2006 | Karandikar et al. | 345/558 |
| 2007/0124722 A1 | * | 5/2007 | Gschwind | 717/106 |

FOREIGN PATENT DOCUMENTS

| | | |
|---|---|---|
| EP | 1102161 | 5/2001 |
| WO | 00/22515 | 4/2000 |

OTHER PUBLICATIONS

Barretta et al., SIMD Extension to VLIW Multicluster Processors for Embedded Applications, Proceedings of the 2002 IEEE International Conference on Computer Design: VLSI in Computers and Processors, Sep. 16, 2002, pp. 523-526.
Pechanek et al., The ManArray Embedded Processor Architecture, Euromicro Conference, 2000 Proceedings of the 26$^{th}$, Sep. 5, 2000, pp. 348-355.
Terechko et al., Inter-Cluster Communication Models for Clustered VLIW Processors, Proceedings of the Ninth International Symposium on High-Performance Computer Architecture, Feb. 8, 2002, pp. 354-364.

* cited by examiner

*Primary Examiner* — Idriss N Alrobaye
(74) *Attorney, Agent, or Firm* — Lisa K. Jorgenson; Allen, Dyer, Doppelt, Milbrath & Gilchrist, P.A.

(57) ABSTRACT

A processor architecture for multimedia applications includes processor clusters providing vectorial data processing capability. Processing elements in the processor clusters process both data with a bit length N and data with bit lengths N/2, N/4, and so on according to a Single Instruction Multiple Data (SIMD) function. A load unit loads into the processor clusters data to be processed according to a same instruction. An intercluster data path exchanges data between the processor clusters. The intercluster data path is scalable to activate selected processor clusters. The processor operates simultaneously on SIMD, scalar and vectorial data.

26 Claims, 4 Drawing Sheets

PROCESSOR ARCHITECTURE WITH PROCESSING CLUSTERS PROVIDING VECTOR AND SCALAR DATA PROCESSING CAPABILITY

FIELD OF THE INVENTION

The invention relates to processor architectures, and in particular, to a microprocessor for multimedia applications.

BACKGROUND OF THE INVENTION

There is an increasing demand for microprocessor architectures adapted to meet the requirements of various multimedia processing tasks and algorithms. The quest for increasing performance levels, however, needs to cope with the demands for limiting power consumption and code size growth.

Vectorial and/or SIMD (Single Instruction, Multiple Data) architectures are thus used in applications with massive data parallelism, while VLIW (Very Long Instruction Word) architectures are optimal for applications with high instruction parallelism.

The multi-dimensional microprocessor described in U.S. published patent application no. 2005/0283587 is exemplary of a microprocessor with SIMD/vectorial capabilities based on a VLIW machine. As mentioned in this description, an example architecture for digital media processing was introduced by Intel with their MXP5800/MXP5400 processor architecture. A multi-dimensional microprocessor architecture improves significantly over this more conventional architecture. For instance, in the MXP5800/MXP5400 architecture, processors require an external PCI-based host processor for downloading microcode, register configuration, register initialization, and interrupt servicing. Conversely, in a multi-dimensional microprocessor architecture this task is allotted to one computational unit for each column.

Moreover, if compared against the case of a multi-dimensional microprocessor, the basic computational block in the MXP5800/MXP5400 processors is inevitably more complex. It includes five programming elements, and each of these has its own registers and its own instruction memory. This entails a significant area size and large power consumption, particularly because a power management unit is not used to power down inactive Processing Elements (PEs).

While prior art arrangements as disclosed in U.S. published patent application no. 2005/0283587 are satisfactory for a number of applications, different types of data and instruction processing may co-exist within the same application. The processor core should support them dynamically by adapting its behavior at run time, i.e., while the algorithm is running.

SUMMARY OF THE INVENTION

In view of the foregoing background, an object of the invention is to provide a processor architecture that is flexible and can be customized at run time to exploit the data and instruction processing features of the processor while minimizing or reducing area and power requirements. This applies particularly to optimizing cache accesses in such a machine.

This and other objects, advantages and features in accordance with the invention are provided by a processor architecture that, while maintaining VLIW and SIMD capabilities essentially similar to those of a multi-dimensional processor in terms of data-wide scalability and possible expansion of instruction parallelism, has the additional feature of a communication channel between the processor clusters and a data path scalability feature that allows different types of operations (Scalar, SIMD and/or vectorial) to be performed in the same parallel pipeline cycles.

The arrangement described herein includes the capability of handling different data types as well as different operating modes in conjunction with the ability of switching dynamically therebetween.

A preferred embodiment of the arrangement described herein is a microprocessor architecture that may be adapted as a high-performance, low-power device suitable for multimedia applications (wireless, image processing, video stream, etc.). The architecture may integrate the instruction parallelism of a basic Very Long Instruction Word (VLIW) architecture with the data parallel processing layout of a Single Instruction Multiple Data (SIMD) architecture. This result may be achieved by a vectorial functionality, integrated in the processor core, and in a data path scalability feature adapted to support on the same machine various architectural approaches, according to the application algorithms and/or to the different data types sections in the algorithm.

The arrangement described herein lends itself to handling simultaneously (e.g., merging) several wide size data processing ($2^k$ bits with k=0, 1, 2, 3, . . . , p). All these different data types can be processed separately or jointly, while the processor core operates as a vectorial machine.

The architecture described herein implements a high-performance and low-power device particularly adapted for multimedia applications (wireless, image processing, video stream, etc.). Significant features of that architecture are a vectorial functionality integrated in the core and data path scalability. This latter feature supports various architecture approaches on the same machine, according to the application algorithms and/or to the different data types in the same algorithm. The architecture described herein combines a purely vectorial machine, a VLIW ILP as well as a SIMD paradigm integrated in the core without separating all these capabilities in terms of structure and resources, and is thus ideally suitable for low-area, low-cost and high-speed devices.

These advantages are particularly welcome in the area of multimedia applications. For instance, the data parallelism available when the machine operates in a vectorial or SIMD manner fits well with the task of processing an image by partitioning it into two or more sections. Also, sequential code sections can be processed by taking advantage of the ease of causing the architecture to operate in a scalar manner. Similarly, the high degree of extensibility of the data types on which the architecture can operate makes it ideally suitable for processing a large amount of a standard benchsuite test collection.

BRIEF DESCRIPTION OF THE DRAWINGS

The invention will now be described, by way of example only, with reference to the enclosed representations, wherein.

DETAILED DESCRIPTION OF THE PREFERRED EMBODIMENTS

By way of introduction for a detailed description of an exemplary embodiment of the arrangement described herein, certain basic concepts of processor architecture will be summarized below. This summary is made with reference to the following: "Computer Architecture: A Quantitative Approach, Third Edition"; John L. Hennessy, David A. Patterson. Specifically, Section 3.6 provides a definition of the concept of VLIW, while Sections 6.1 and 6.16 provide definitions of the SIMD paradigm. Appendix G provides reference information on Vector Processors.

VLIW: Very Long Instruction Word. The purpose of a multiple-issue processor is to allow multiple instructions to issue in a clock cycle. Multiple-issue processors come in two basic types: superscalar processors and VLIW (Very Long Instruction Word) processors. Superscalar processors issue variable numbers of instructions per clock cycle, and are either statically scheduled or dynamically scheduled. Statically scheduled processors use in-order execution, while dynamically scheduled processors use out-of-order execution. VLIW processors issue a fixed number of instructions per clock cycle that are formatted either as one large instruction or as a fixed instruction packet with the parallelism among instructions explicitly indicated by the instruction. VLIW processors are inherently statically scheduled by the compiler.

SIMD: Single Instruction Multiple Data. In a SIMD arrangement the same instruction is executed by multiple processors using different data streams. Each processor has its own data memory (hence multiple data), but there is a single instruction memory and control processor, which fetches and dispatches instructions. SIMD arrangements work best in dealing with arrays in for-loops. Hence, in order to exploit massive parallelism in SIMD architectures, massive amounts of data, or data parallelism, needs to be present. SIMD architectures are at their weakest point in case statements where each execution unit needs to perform a different operation on its data, depending on what data are available. Those execution units with the wrong data are disabled so that the proper units can continue. Such situations essentially run at 1/n performance level, where n is the number of cases.

Vector Processors. Vector processors adopt an alternative approach to control multiple functional units with deep pipelines. Vector processors provide high-level operations that act on vectors (linear arrays of numbers). A typical vector operation might add two 64-elements, floating-point vectors to obtain a single 64-element vector result. The vector instruction is equivalent to an entire loop, with each iteration computing one of the 64 elements of the result, updating the indexes, and branching back to the beginning. By using a vector instruction, the compiler or programmer indicates that the computation of each result in the vector is independent of the computation of other results in the same vector. Consequently, the hardware does not have to check for data hazards within a vector instruction. The elements in the vector can be computed using an array of parallel functional units, or a single, deeply pipelined functional unit, or any intermediate configuration of parallel and pipelined functional units.

Turning now specifically to the description of a preferred, exemplary embodiment of the invention, the arrangement described herein is a microprocessor architecture adapted to implement a high-performance, low-power device suitable for multimedia applications (wireless, image processing, video stream, etc.). The arrangement described herein is based on the concept of extending the instruction parallelism of a basic Very Long Instruction Word (VLIW) architecture with the data parallel processing of the Single Instruction Multiple Data (SIMD) paradigm.

Two significant features of the arrangement described herein are as follows: the vectorial functionality integrated in the core (i.e., without providing any specific unit which is able to perform the same instruction on a large amount of data, like current Vector Processor use to do); and data path scalability which allows supporting various architectural solutions in the same machine, according to the application algorithms and/or to the different data type sections in the same algorithm.

The arrangement described herein adopts a simple architectural approach to merge data processing tasks with different sizes or widths ($2^{-k}$ bits with k=0, 1, 2, 3, . . . , p). All these different data types can be processed separately or jointly, while the core operates as a vectorial machine.

Figure 1:
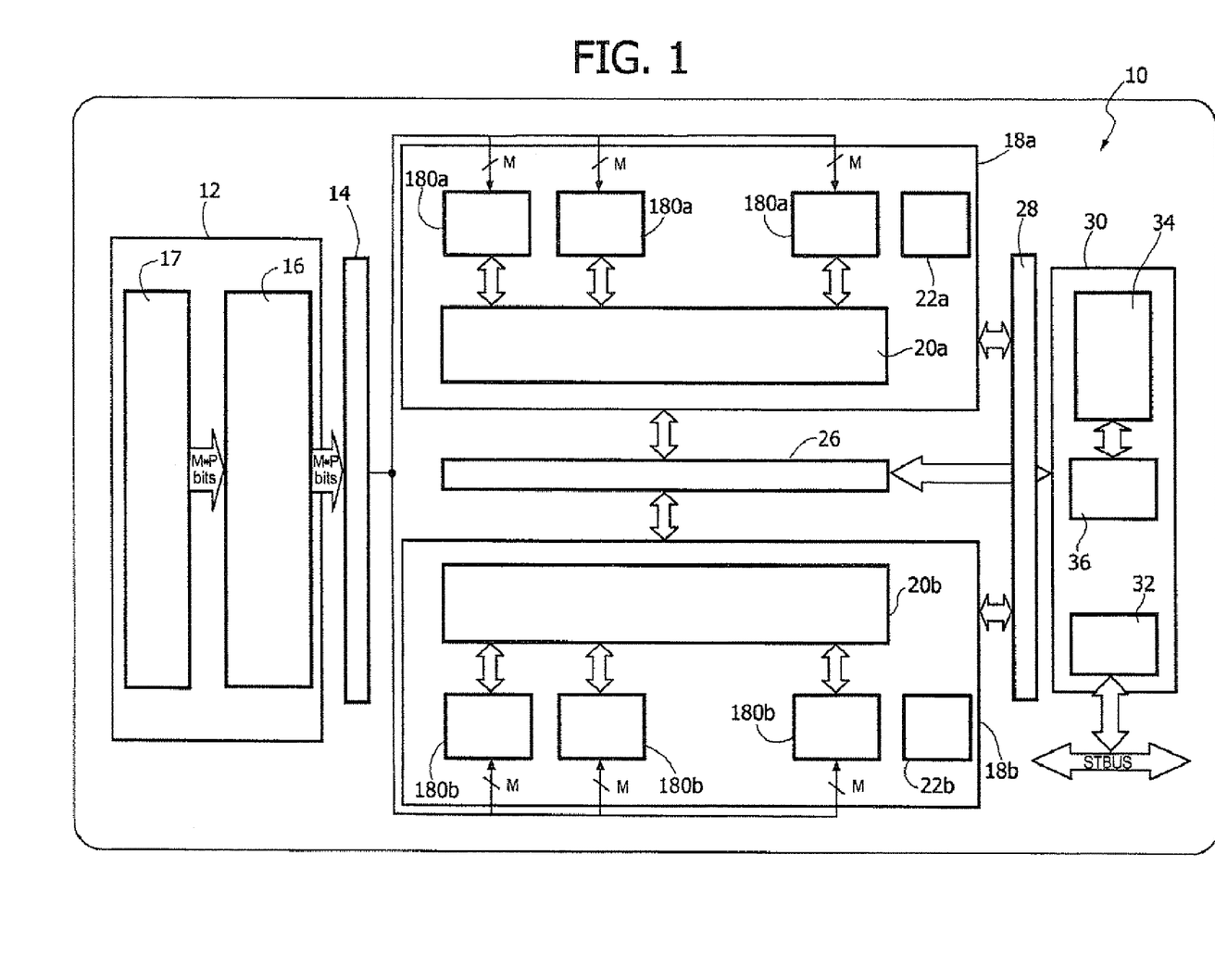
FIGS. 1 and 2 are block diagrams representative of the processor architecture at different levels of detail according to the invention.
Figure 2:
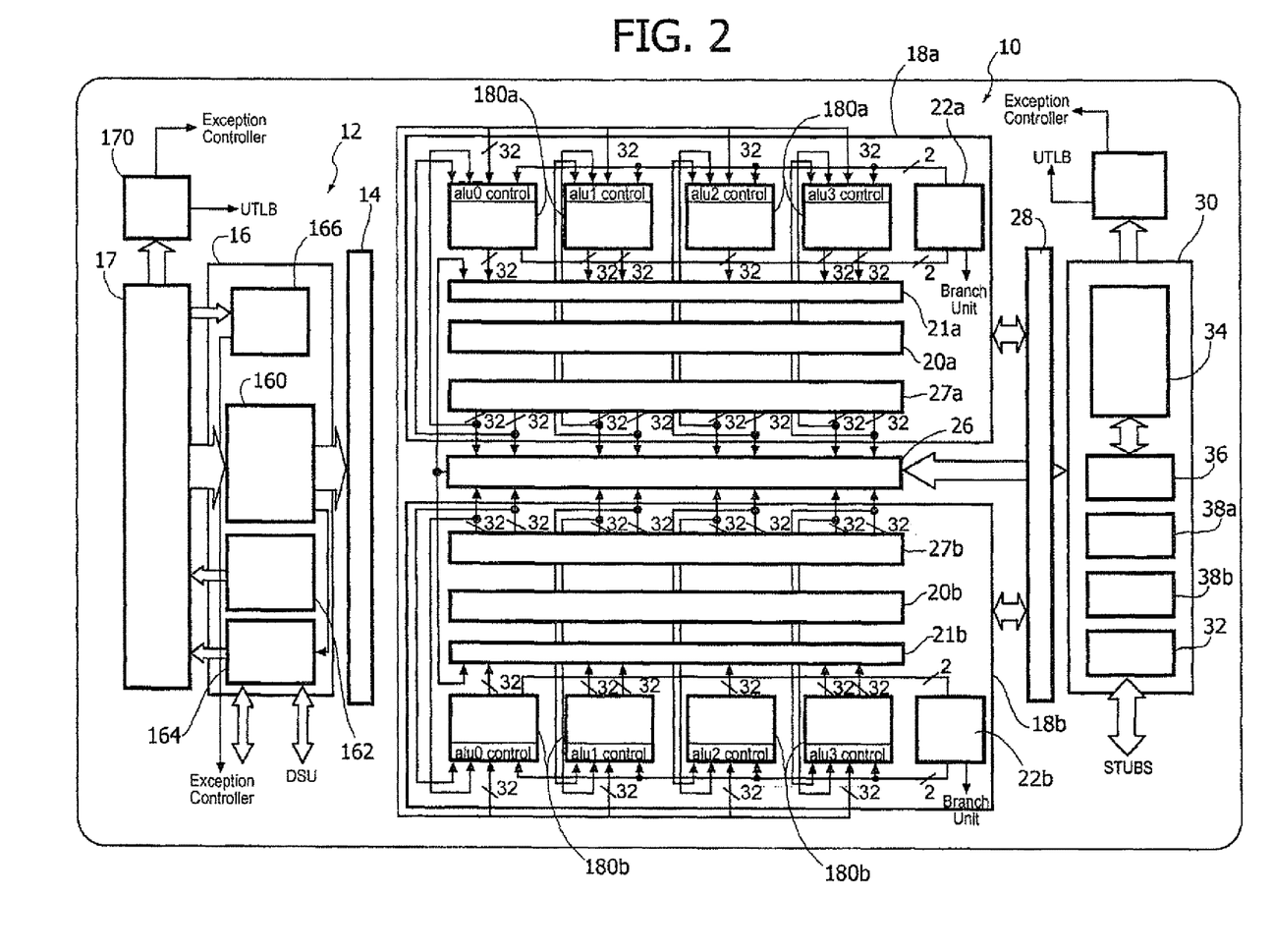

FIGS. 1 and 2 are block diagrams of an exemplary microprocessor architecture 10. Hereinafter, M and N will indicate the number of bits in each instruction and each data, respectively, as processed in the architecture 10. Similarly, P will indicate the number of Processing Elements (ALUs) and/or the number of ILPs (instructions packed in the same long instruction).

More in detail, the architecture 10 includes an I-Side (i.e., Instruction Side) Memory Subsystem 12 represents the VLIW instruction parallelism capability, and P instructions are fetched (ideally) and decoded each clock cycle.

Reference numeral 14 denotes a Decoder Unit that, as a single decoding unit, is able to recognize the P instructions fetched via an Instruction Buffer/Fetch Unit 16. The instructions are issued towards homologous Processing Elements (ALUs) 180*a*, 180*b* arranged in two clusters, namely a high cluster (ALUs 18*a*) and a low cluster (ALUs 18*b*).

As better shown in FIG. 2, the I-Side Memory Subsystem also includes an instruction cache (Icache) 17 interfacing with an ITLB module 170. The Instruction Buffer/Fetch Unit 16 includes an Instruction Buffer/Fetch Block proper, indicated as 160, having associated an Icache control unit 162 and a PC and Branch Unit 164 (for ensuring DSU and Exception controller functionalities) as well as an IPU 166.

The plural clusters, typically to the number of two, i.e., 18*a*, 18*b*, lie at the basis of the vectorial functionality of the architecture 10. The computational units of the processor are in fact represented by the two clusters 18*a*, 18*b* (High and Low) each of which includes P Processing Elements (ALUs) 180*a* (cluster high 18*a*) and 180*b* (cluster low 18*b*) that integrate various computational resources, e.g., adders, multipliers, shifters as well as fully customized, and hardware dedicated units.

Each Processing Element (PE) in either cluster 18*a*, 18*b* has the same range of computational resources of a symmetrical PE in the other cluster. This type of resource distribution guarantees or insures a proper vectorial capability as described above. Each PE is able to operate with N bit data and/or in a SIMD way. This means that the architecture 10 is capable of operating both as a scalar microprocessor (with N bit data width) as well as with two N/2 bit data or four N/4 bit data and so on (data with bit lengths obtained by partitioning the bit length N according to a Single Instruction Multiple Data paradigm) as long as this approach is meaningful, according to the application data types.

Each cluster 18*a*, 18*b* has an associated general purpose register file 20*a*, 20*b* (with respective write-port multiplexers 21*a* and 21*b*, shown in FIG. 2 only), bypass elements 27*a*, 27*b* (again shown in FIG. 2 only) and an associated branch register file 22*a*, 22*b*. Each branch register file is configured to support the SIMD capability, as better detailed in the following.

Hereinafter the distinction of the two clusters 18*a*, 18*b* as high and low will refer to the use in association with the N high (i.e., more significant) bits and the N low (i.e., less significant bits) of 2*N bits operands loaded into the clusters 18a, 18b by a Load/Store Unit 26.

An Intercluster Data Path 28 allows exchanging and/or merging data between the two clusters 18a, 18b. The Intercluster Data Path 28 is capable of performing pure 2*N bit data operations, as better detailed in the following. The Intercluster Data Path 28 has the main purpose of enabling the architecture 10 to use and mix, at the same time, information contained in adjacent data (like the pixels in an image, for example) as typically required in multimedia applications.

The D-Side (i.e., Data Side) Memory Subsystem 30 and the Load/Store Unit 26 manage data fetching, data storage and communication with the external memory through a core memory controller 32 interfacing with an external bus (e.g., STBUS). Within the D-Side Memory Subsystem 30 Reference numerals 34 and 36 indicate a Data Cache (DCache) and the associated DCache control unit, respectively. Finally, references 38a and 38b designate a prefetch buffer and a write buffer, respectively.

The machine/architecture 10 illustrated herein is able to run the same instruction separately and simultaneously (in a parallel way) on each cluster 18a, 18b on the lower and higher part of the 2*N bit data. This approach allows Vector instructions to be executed on the two N-bit data.

The data path scalability allows support for the following types of functionality.

N bit Scalar functionality. By activating only the low cluster 18b, the architecture can operate in a standard N bit data mode to preserve the VLIW original functionality. This is useful for exploiting primarily the Instruction Level Parallelism.

N bit Vectorial functionality. By activating both clusters 18a, 18b (Vectorial machine), the same standard (scalar) N bit instructions can be performed in a parallel mode on different N data bits. This type of functionality can be defined N bit SIMD data. Significantly, the VLIW capability (M*P instructions at each clock cycle) linked with an N bit Vectorial functionality is essentially equivalent to the Vector processor reported in the literature. As explained in the introductory portion of this detailed description, if the computation of each result in the data vector (i.e., the vector whose elements of N bits are stored in the General Purpose Register Files 20a, 20b), is independent of the computation of other results in the same data vector, the elements in the data vector can be computed using the array of parallel Processing Elements.

Should the need arise, the scalability extension of the number of the Processing Elements in the clusters 18a, 18b allows to pack P times the same instruction that processes a very large number of N bit data. This is in contrast to a conventional vector processor, which would require storing and processing at least a part of these data in a separate part of the machine. Here, the integration of the Vectorial side is actually effected in the Scalar core.

N/k (k=2, 4, 8 . . . ) bit SIMD functionality. By activating only the low cluster 18b, N/2 bit, N/4 bit (and so on) data SIMD instructions can be performed. This data path approach essentially represents a typical SIMD machine. Obviously, the Processing Elements in the cluster 18b must be supported (i.e., logically configured) to operate as N/k (k=2, 4, 8 . . . ) bit data as well as N bits data. The information to select one of these operational modes is in the instruction itself (e.g., as a dedicated field of instruction bits).

Vectorial SIMD machine. This corresponds to activating both clusters 18a, 18b to perform N/k (k=2, 4, 8 . . . ) data SIMD instructions. This functionality can also be regarded as 2*N bit SIMD data. It is an extension of an operative functionality that allows exploiting more extensively the data parallelism when the application algorithm can be organized with packed data that are a fraction of N.

As mentioned previously, data can be exchanged between the two clusters 18a, 18b through the Intercluster Data Path 28, which is also configured in order to be able to perform operations on the data. This will permit to extend the Instruction Set Architecture with pure 2*N bit operations. The operands for these operations are derived from the Register Files 20a, 20b in the two clusters 18a, 18b, thus making it unnecessary for the module 28 between the clusters 18a, 18b to have a respective register file available for its own.

The architecture 10 just described allows each vectorial element to operate on packed data as a SIMD processor. However, when using only the low cluster 18b, when the application does not require vectorial data processing, it is possible to disable the high cluster 18a, thus reducing power consumption. This kind of cluster power management can be controlled via a single bit included in the instructions itself.

The degree of instruction parallelism obtained with the VLIW approach, in conjunction with the data path approaches discussed in the foregoing, contributes to another significant feature of the architecture 10 described herein, namely the possibility to provide—in the same bundle of multiple instructions and at the same time: N bit scalar operation; N bit SIMD operation; N/k (k=2, 4, 8 . . . ) bit SIMD operation (on a single cluster); and 2*N bit SIMD operation processed separately on the two clusters or jointly via ad hoc instructions in the Intercluster Data Path module 28.

The goal of performing within the same bundle multiple instructions on different data sizes is achieved by rendering pipe management functions mutually independent.

The architecture 10 will recognize a functionality as Vectorial and SIMD directly from the instruction opcode. This permits a natural extension of the instruction set reserving two bits for these purposes.

For instance, a practical non-limiting example can be considered where:

M=32: this is a typical instruction opcode size;

N=32: the machine operates on 32 bit data (the load/store unit 26 will fetch 64-bit data from the memory 34);

P=4: four ALUs are used as the Processing Elements and represent the computational resources of the core; as a consequence the VLIW ILP is of four instructions that are fetched and executed each pipe cycle.

The possible data path approaches are:

32 bit Scalar functionality, activation of the low cluster 18b;

32 bit vectorial functionality, both clusters 18a, 18b are activated (vectorial machine);

16 and/or 8 bit SIMD functionality: only the low cluster 18b is activated to perform 16-bit and/or 8-bit data SIMD instructions (if the ALUs are able to operating both with 16-bit and 8 bit operands);

vectorial SIMD machine: both clusters 18a, 18b are activated to perform 16-bit and/or 8-bit data SIMD instructions, this represents a 64 bit SIMD operative solution on two separated groups of 2*16 or 4*8 bits of data; and the intercluster data path 28 exchanges data between the two clusters 18a, 18b with the possibility of extending the Instruction Set Architecture with pure 64 bits operations.

The architecture just described relies on its intrinsic Data Path Scalability, a simple approach that provides a very high degree of flexibility that makes it possible to handle simultaneously different data types and, possibly, to execute more complex 2*N bit operations (64-bit operations, in the practical example) through the intercluster data path.

The architecture 10 can thus very easily adapt to different kinds of applications in the multimedia field. This is due to the hybrid nature of the architecture, which provides a high performance level with just a very limited increase in terms of occupied area. A basic advantage is related to the possibility of change at runtime, instruction by instruction, the bit size of the computational units with the possibility of operating on data with different bit lengths in the same clock cycle. This permits a full support of Data Path Scalability with the proper resources.

Those of skill in the art will appreciate that the notional weakness of separate N-bit processing translates into an increased strength in terms of system availability and extensibility. Each of the clusters 18a, 18b includes independent processing elements (PEs) 180a, 180b, and the possibility of connecting clusters via a local data path, makes it much easier to replace a certain processing element with another (held to be more suitable for meeting the design requirements) without modifying the internal connection logic as required in a conventional multiprocessor system.

This kind of pseudo-isolation of the two clusters 18a, 18b also renders the machine easier to expand without having to bring down the application that runs on it. High availability and fast, incremental extensibility are key features of the architecture just described in many IC fields.

Another interesting feature of the architecture just described is instruction extensibility. The architecture 10 can execute both SIMD and MIMD instructions by becoming easily available and adaptable to various algorithms, or various sections of the same algorithm, that require different degrees of Instruction Level Parallelism or Data Level Parallelism for high speed performance.

Power control is primarily managed at the instruction schedule level. A good compiler and a judicious algorithm code writing can take advantage of multiple and mixed machine capability to make the schedule of the instructions and their packing in the bundle a proper basis for low power consumption. For instance the instruction can selectively activate or and de-activate the high cluster 18a when operation does not require the computational resources associated therewith. Power control can be advantageously performed at the level of processing element (PEs) when any of them are not used, e.g., as the compiler has not found P independent operations.

Figure 3:
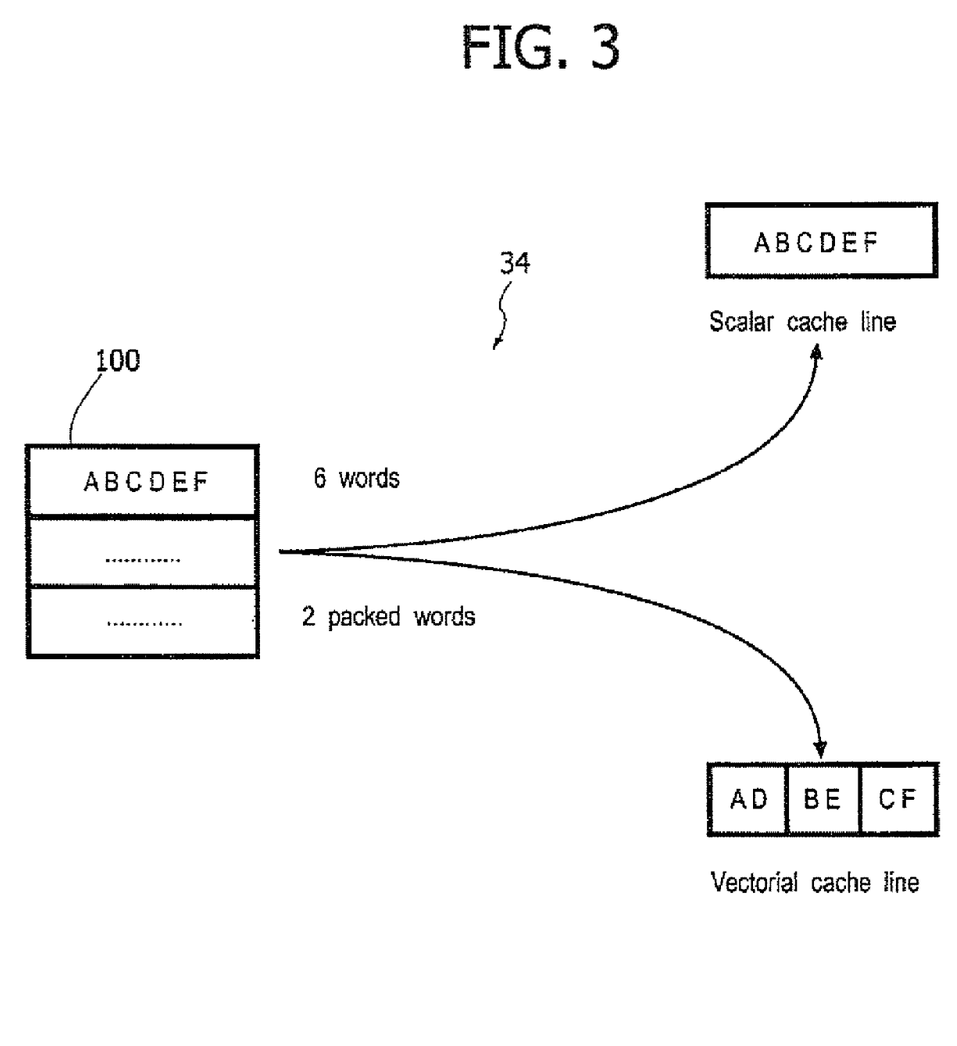
FIGS. 3 to 5 are functional block diagrams representative of a general concept of a cache access applied to the processor architecture according to the invention.
Figure 4:
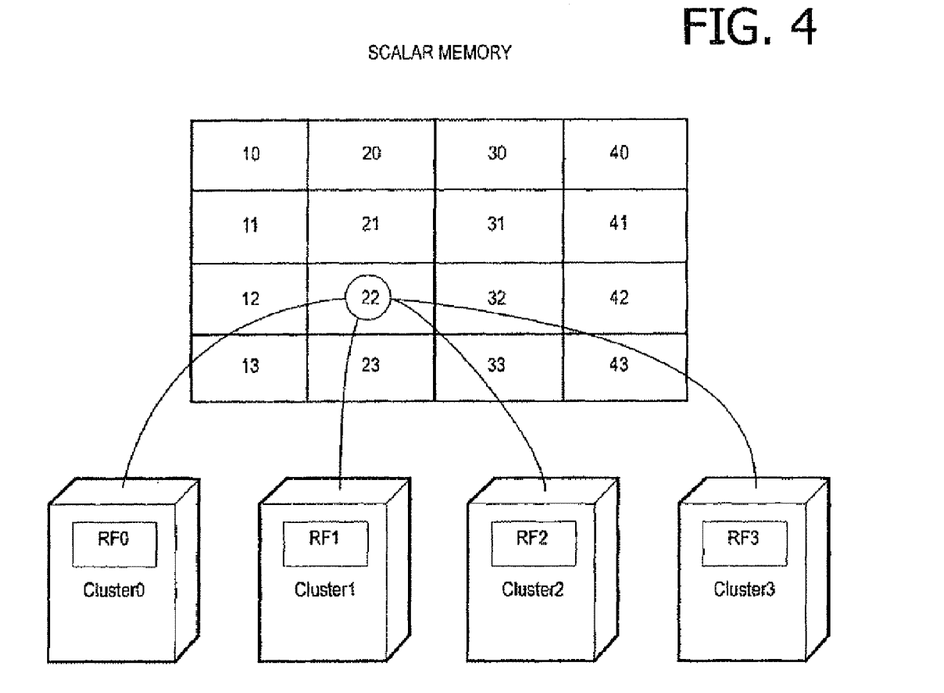
Figure 5:
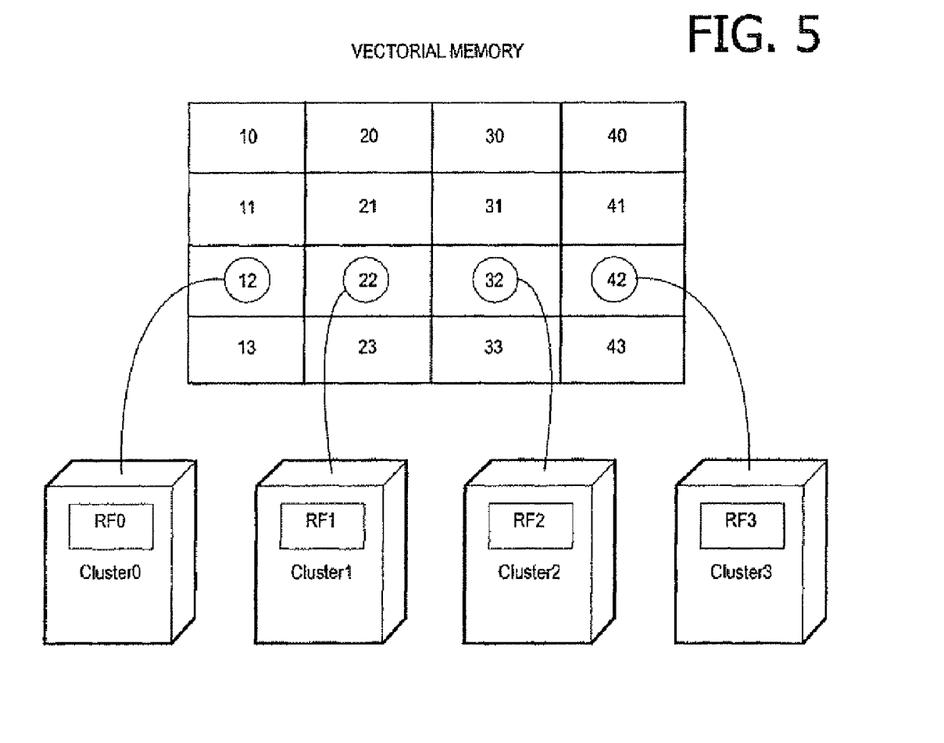

FIGS. 3 to 5 annexed herewith are exemplary of the possibility of applying to the arrangement described in the foregoing a new approach for optimizing cache accesses in a vectorial machine. Such an approach is the subject matter of a parallel European application filed on the same date by the same applicant.

In that respect, the general description provided in connection with FIGS. 4 and 5 herein will refer to a generic vectorial machine (i.e., not necessarily patterned after the architecture described in the foregoing) and including four clusters in the place of two as an example of applying that approach to any plurality of clusters. Those of skill in the art will easily understand how such a generic description can be scaled-down to serve two clusters.

The related access mechanism is based on using a single cache (such as the Data cache 34 of FIGS. 1 and 2) that is accessed by using both a global-type access mechanism and a local-type access mechanism. In other words, the cache is considered both as a single cache (SM) or as a cache comprised of a plurality of smaller caches (DM). The choice between the two approaches is not made in a static manner, but run-time and can vary from one line of cache to another.

This result is achieved with the introduction of control registers that explicitly map those data locations of the (cache) memory to be considered as scalar and those data locations to be considered as vectorial.

When transferring data between an external memory 100 (FIG. 3) and the cache (the cache 34 will be considered here as an example), if the location (e.g., a line) to which data is being transferred is in the scalar address space then the data is copied, as it is, in the cache line and the data contained therein are considered as a set of K words of dimension w. Conversely, in the vectorial case, these data are considered as a set of K/L words of dimension L*w containing the data to be sent to the L clusters (obviously L=2, in the example of FIGS. 1 and 2). In fact each cache line is regarded, under all respects, as subdivided into L lines of dimension K/L (the data of dimension L*w is then subdivided into L data of dimension w, by ensuring the correct routing towards the relative cluster).

This approach is represented in FIG. 3. The right portion thereof shows a scalar cache line and a vectorial cache line, respectively. In that way, the same cache memory can be regarded as a cache memory wherein each line includes K*L words having a dimension w in the scalar case or K words having a dimension L*w in the vectorial case, by ensuring in both instances an optimum exploitation of the cache memory.

When reading a data item present in the cache memory, the information as to the type of data to read (as derived from the control registers) is read as a first step. If the address to be accessed is marked as scalar, the single data item is accessed by making it available simultaneously to all clusters (FIG. 4).

If conversely, access is regarded as vectorial, a data dimension is considered equal to L times the scalar data item, where L is the number of clusters that are active, and the data are copied as shown in FIG. 5, i.e., as L data items respectively distributed to the L processor clusters that are active.

If access is scalar, the address is computed based on its own data by the cluster that needs the data. In the case of vectorial access, the address is computed only by one of the processors and is identical for all of them.

An evident advantage of the mechanism just described lies in the possibility of managing both parallel and scalar parts in an algorithm, while always fully exploiting the cache memory (even if just one of the processors is operating, this has the full availability of the entire cache memory).

Moreover, the capability of establishing and modifying run-time on portions of the memory are to be considered vectorial and on portions of the memory that are to be considered scalar, together with the possibility for each cluster to access the memory in a scalar way, makes it possible to perform in a simple and rapid manner initialization and data exchange operations between the clusters.

This feature renders the cache controller even more versatile and adapted to operate with a vectorial architecture having a number of clusters higher than two. If required, the cache can play the role of the intercluster data path when this is not present, or in those arrangements where introducing a high number of inter-cluster connections would be excessively cumbersome.

Additionally, the possibility exists of accessing directly in a scalar mode a data item present in the cache memory and forwarding it to all the clusters currently active without having plural copies of the same data (e.g., constants) as it would happen in the case of distributed cache memories.

The example just described refers to a direct-mapped cache for the sake of simplicity, but the proposed approaches can be applied without limitations irrespective of the policy adopted for cache management.

An architecture as portrayed in FIG. 2 has been implemented with the following characteristics:

Clock frequency: 400 MHz→600 MHz

Data parallelism: average 2.5× (peak of 4× the ST231 performances inside inner loops 16 bit based)

Power: 200 mW @400 MHz. Max power dissipation: 0.25-0.30 mW/MHz (estimation in 90 nm).

Area: <2 mm$^2$ with 32+32 KB I/D$ caches.

Without prejudice to the underlying principles of the invention, the details and the embodiments may vary, even appreciably, with reference to what has been described by way of example only, without departing from the scope of the invention as defined by the annexed claims.

That which is claimed:

1. A processor comprising:
   an instruction subsystem for inputting instructions to be executed;
   a plurality of processor clusters coupled to said instruction subsystem, each processor cluster comprising a plurality of homologous processing elements that are symmetrical with processing elements in other processor clusters for processing data according to the instructions to be executed for providing a vectorial processing capability, and for processing data with a given bit length N and data with bit lengths obtained by partitioning the given bit length N according to a Single Instruction Multiple Data function, with processing elements in each processor cluster having a same range of computational resources of symmetrical processing elements in the other processor clusters;
   a load unit for loading into said plurality of processor clusters the data to be processed in sets of high significant bits and low significant bits of operands according to an instruction;
   an intercluster data path for exchanging data between said plurality of processor clusters, said intercluster data path being scalable to activate selected processor clusters for operating simultaneously on Single Instruction Multiple Data, scalar data and vectorial data; and
   said plurality of processor clusters configured so that only one processor cluster is activated to operate on data having the given bit length N when in a scalar functionality mode, and configured so that said plurality of processor clusters operate in parallel on data having the given bit length N when in a vectorial functionality mode.

2. The processor of claim 1, wherein said instruction subsystem inputs multiple instructions in a single clock cycle.

3. The processor of claim 1, wherein said plurality of processor clusters comprise a pair of processor clusters.

4. The processor of claim 1, wherein said intercluster data path is scalable according to the following operating modes:
   the scalar functionality mode over the given bit length N, wherein only one processor cluster is activated to operate on data having the given bit length N;
   the vectorial functionality mode over the given bit length N, wherein said plurality of processor clusters operate in parallel on data having the given bit length N;
   a Single Instruction Multiple Data functionality mode, wherein only one processor cluster operates on data with bit lengths N/k obtained by partitioning the given bit length N; and
   a vectorial Single Instruction Multiple Data functionality mode, wherein said plurality of processor clusters operate simultaneously on data with bit lengths N/k obtained by partitioning the given bit length N.

5. The processor of claim 1, wherein said intercluster data path is configured for performing operations on the data.

6. The processor of claim 5, wherein said intercluster data path is configured for performing operations on the data with a bit length that is a multiple of the given bit length N.

7. The processor of claim 5, wherein each processor cluster further comprises a register file, and wherein said intercluster data path is configured for deriving from said register files the data for performing the operations.

8. The processor of claim 1, further comprising a data cache memory coupled to said intercluster data path for storing data therein for processing, the data locations being accessible either in a scalar mode or a vectorial mode.

9. The processor of claim 8, further comprising at least one control register coupled to said data cache memory for mapping the respective data locations as scalar or vectorial.

10. A processor comprising:
    an instruction subsystem for inputting instructions to be executed;
    a plurality of processor clusters coupled to said instruction subsystem, each processor cluster comprising a plurality of homologous processing elements for processing data according to the instructions to be executed for providing a vectorial processing capability, and for processing data with a given bit length N and data with bit lengths obtained by partitioning the given bit length N according to a Single Instruction Multiple Data function, each processing element in each processor cluster having a same range of computational resources of a symmetrical processing element in a different processor cluster;
    a load unit for loading into said plurality of processor clusters the data to be processed according to an instruction;
    an intercluster data path for exchanging data between said plurality of processor clusters, said intercluster data path being scalable to activate selected processor clusters for operating simultaneously on Single Instruction Multiple Data, scalar data and vectorial;
    a memory coupled to said intercluster data path for storing data therein for processing, the data locations being accessible either in a scalar mode or a vectorial mode; and
    said plurality of processor clusters configured so that only one processor cluster is activated to operate on data having the given bit length N when in a scalar functionality mode, and configured so that said plurality of processor clusters operate in parallel on data having the given bit length N when in a vectorial functionality mode.

11. The processor of claim 10, wherein said instruction subsystem inputs multiple instructions in a single clock cycle.

12. The processor of claim 10, wherein said plurality of processor clusters comprise a pair of processor clusters.

13. The processor of claim 10, wherein said intercluster data path is scalable according to the following operating modes:
    the scalar functionality mode over the given bit length N, wherein only one processor cluster is activated to operate on data having the given bit length N;
    the vectorial functionality mode over the given bit length N, wherein said plurality of processor clusters operate in parallel on data having the given bit length N;
    a Single Instruction Multiple Data functionality mode, wherein only one processor cluster operates on data with bit lengths N/k obtained by partitioning the given bit length N; and a vectorial Single Instruction Multiple Data functionality mode, wherein said plurality of processor clusters operate simultaneously on data with bit lengths N/k obtained by partitioning the given bit length N.

14. The processor of claim 10, wherein said intercluster data path is configured for performing operations on the data.

15. The processor of claim 14, wherein said intercluster data path is configured for performing operations on the data with a bit length that is a multiple of the given bit length N.

16. The processor of claim 15, wherein each processor cluster further comprises a register file, and wherein said intercluster data path is configured for deriving from said register files the data for performing the operations.

17. The processor of claim 10, further comprising at least one control register coupled to said data cache memory for mapping the respective data locations as scalar or vectorial.

18. A method for processing data in a processor comprising an instruction subsystem; a plurality of processor clusters coupled to the instruction subsystem, each processor cluster comprising a plurality of homologous processing elements; a load unit coupled to the plurality of processor clusters; and an intercluster data path, the method comprising:
   inputting instructions by the instruction subsystem to be executed;
   processing data by the plurality of processing elements according to the instructions to be executed for providing a vectorial processing capability, and for processing data with a given bit length N and data with bit lengths obtained by partitioning the given bit length N according to a Single Instruction Multiple Data function, each processing element in each processor cluster having a same range of computational resources of a symmetrical processing element in a different processor cluster;
   operating the load unit for loading into the plurality of processor clusters the data to be processed according to an instruction;
   exchanging data between the plurality of processor clusters over the intercluster data path, the intercluster data path being scalable to activate selected processor clusters for operating simultaneously on Single Instruction Multiple Data, scalar data and vectorial data; and
   the plurality of processor clusters configured so that only one processor cluster is activated to operate on data having the given bit length N when in a scalar functionality mode, and configured so that the plurality of processor clusters operate in parallel on data having the given bit length N when in a vectorial functionality mode.

19. The method of claim 18, wherein the instruction subsystem inputs multiple instructions in a single clock cycle.

20. The method of claim 18, wherein the plurality of processor clusters comprise a pair of processor clusters.

21. The method of claim 18, wherein the intercluster data path is scalable according to the following operating modes:
   the scalar functionality mode over the given bit length N, wherein only one processor cluster is activated to operate on data having the given bit length N;
   the vectorial functionality mode over the given bit length N, wherein the plurality of processor clusters operate in parallel on data having the given bit length N;
   a Single Instruction Multiple Data functionality mode, wherein only one processor cluster operates on data with bit lengths N/k obtained by partitioning the given bit length N; and
   a vectorial Single Instruction Multiple Data functionality mode, wherein the plurality of processor clusters operate simultaneously on data with bit lengths N/k obtained by partitioning the given bit length N.

22. The method of claim 18, wherein the intercluster data path is configured for performing operations on the data.

23. The method of claim 22, wherein the intercluster data path is configured for performing operations on the data with a bit length that is a multiple of the given bit length N.

24. The method of claim 23, wherein each processor cluster further comprises a register file, and wherein the intercluster data path is configured for deriving from the register files the data for performing the operations.

25. The method of claim 18, wherein the processor further comprises a data cache memory coupled to the intercluster data path for storing data therein for processing, the data locations being accessible either in a scalar mode or a vectorial mode.

26. The method of claim 25, wherein the processor further comprises at least one control register coupled to the data cache memory for mapping the respective data locations as scalar or vectorial.

* * * * *